United States Patent [19]
Heinrich

[11] 3,829,561
[45] Aug. 13, 1974

[54] IRON PREPARATION AND PROCESS FOR ITS MANUFACTURE

[76] Inventor: Hellmuth Carl Heinrich, c/o Farbwerke Hoechst AG., Frankfurt(Main), Germany

[22] Filed: Mar. 19, 1969

[21] Appl. No.: 808,676

[30] Foreign Application Priority Data
Mar. 21, 1968 Germany.......................... 1767017

[52] U.S. Cl..................... 424/44, 424/147, 424/295
[51] Int. Cl...... A61k 9/00, A61k 9/04, A61k 27/00
[58] Field of Search .......... 424/147, 44; 167/57 LT; 252/157

[56] References Cited
UNITED STATES PATENTS
1,450,865   4/1923   Pele .................................... 252/157

OTHER PUBLICATIONS

Kastrup et al., Facts and Comparisons, 1967 pages 66, 67 and 68.

Drug and Cosmetic Industry, Oct. 1946, page 541.

*Primary Examiner*—Albert T. Meyers
*Assistant Examiner*—Allen J. Robinson
*Attorney, Agent, or Firm*—Curtis, Morris & Safford

[57] ABSTRACT

Iron preparation for oral application containing ferro-ions in the form of an iron-II-salt, a physiologically tolerable solid acid and a compound yielding carbon dioxide.

7 Claims, No Drawings

IRON PREPARATION AND PROCESS FOR ITS MANUFACTURE

The present invention relates to an oral iron preparation containing ferro-ions in the form of a physiologically tolerable iron-II salt, a physiologically tolerable acid which is solid under the administration conditions and has an acidity greater than that of carbonic acid, and a compound yielding carbon dioxide.

Iron deficiency is the widest spread deficiency of the human body. It is especially pronounced, for example, in menstruating and pregnant women and in male blood donors. For example, about 40 to 50 percent of all blood donors and menstruating women as well as 100 percent of all late-pregnant women show an iron deficiency (prelatent, latent or manifest iron deficiency with exhausted iron reserves). Numerous trade products are known that contain physiologically tolerable iron compounds and are intended, above all, to remedy iron deficiency. Iron preparations of this kind contain, in addition to the iron compound chosen, various additives and adjuvants, for example vitamins, sugar, unsaturated fatty acids, alkaline earth metal oxides, yeast extracts containing vitamins A and B, lipotropic substances as well as, in many cases, a large amount of galenic adjuvants which exceeds by far the amount of active ingredient. The oral iron preparations pertaining to the state of the art are generally resorbed so poorly that even when a high and long-lasting dosage is administered the iron reserves of the body are not replenished nor is a normalisation of the iron resorption achieved. Their administration involves considerable effects of intolerability in the gastro-intestinal tract because of too high a local concentration in the stomach (too slow a decomposition of the preparations, high dosage to compensate for the poor resorption). Further disadvantages are, in many cases, discoloration of the teeth and unpleasant taste of the preparations. Those considerable drawbacks of the known iron preparations, especially their poor resorbability, are overcome by the iron preparation of the present invention.

The present invention provides a well-resorbable oral iron preparation which comprises, per dosage unit, a. a content of $Fe^{++}$-ion of from about 10 to 200 mg in the form of an iron-II salt the anion of which is physiologically tolerable,
b. a content of a physiologically tolerable acid that is solid under the administration conditions and which has an acidity greater than to that of carbonic acid and
c. a content of a compound yielding carbon dioxide.

The present invention, moreover, relates to a process for the manufacture of an oral iron preparation which comprises mixing the components mentioned under (a), (b) and (c) with one another and, where required, bringing the mixture into a galenic dosage unit form.

As iron-II salts having physiologically tolerable anions, iron chloride, iron sulfate, iron fumarate, iron succinate, iron citrate, iron lactate, iron carbonate or iron gluconate, preferably iron sulfate, may be mentioned by way of example. Instead of iron-II salts, iron-III salts which are converted into iron-II salts when administered in the presence of substances having a reducing action, for example ascorbic acid, may also be used. It is important for the preparation of the invention to contain as acid component a pharmaceutically tolerable acid the acidity of which is sufficient to liberate carbon dioxide from a carbonate or bicarbonate solution. This requirement has to be met in as far as the liberation of carbon dioxide has to be assured even in a gastric juice which is not acid owing to a disease. As acids of this type there are used, for example, ascorbic acid, citric acid, tartaric acid, preferably ascorbic acid. Compared with the rest of the acids cited, ascorbic acid has the advantage of having a stabilizing effect on the iron-II salt because of its reducing properties. When different acids are used, it is generally necessary to use, in addition, a suitable stabilizer which is, to a large extent, not autoxidable in the air and which serves the indicated purpose.

As compounds yielding carbon dioxide there may be mentioned carbonates or bicarbonates, especially the alkali metal salts and alkaline earth metal salts, for example sodium carbonate, sodium bicarbonate, preferably sodium bicarbonate.

The proportions of the preparation of the invention chosen are such that the amounts of acid and bicarbonate permit a sufficient evolution of carbon dioxide in the stomach, thus assuring a rapid fine-division of the iron salt and preventing a local irritation of the mucous membrane. The dosage unit advantageously contains an amount of iron-II salt that corresponds to about 10 – 200 mg, preferably about 20 – 100 mg, especially 50 mg, of ferro-ions. The physiologically tolerable acid used, preferably ascorbic acid, is in the range of from about 50 to 1,000 mg, preferably about 100 to 500 mg, especially it is 250 mg.

The acid used is, preferably, in an excess, calculated on the amount of the iron-II salt. The amount of carbonate or bicarbonate may be approximately equivalent, preferably less than, the amount of acid. The excess of acid may, for example, be about 1.5 to 3 times the amount of the compound yielding carbon dioxide, but it may even be more or less. Even a minor amount of acid is possible but generally not suitable with regard to the acidity conditions in the stomach. In case the oral iron preparation of the invention is intended to be administreed to a particular group of persons, for example to pregnant women, it may be advantageous to add still other substances that do not inhibit iron resorption, for example folic acid or vitamin $B_{12}$. It is, moreover, also possible to add compounds which promote resorption, for example succinic acid.

It may, for example, be advantageous to use iron preparations of the invention wherein the iron-II ion is replaced by radioactive iron, when, in the course of a therapy directed to remedy an iron deficiency, the success of the treatment is to be established at determined intervals by measuring the radioactivity of the total body.

The galenic dosage unit forms used are oral preparations, for example tablets, coated tablets, dragees, preferably capsules such as hard gelatine capsules. The use of such a capsule offers the advantage of a dosage unit form of the preparation of the invention which can be produced in a simple manner with the exclusion of moisture, and a direct conveyance of the preparation into the stomach where the capsule opens after having been penetrated by the gastric juice. The iron preparation of the invention has to be taken on a stomach that has been empty for several hours, preferably in the morning.

Compared with prior art preparations, the iron preparation of the present invention is distinguished, as regards the therapeutical properties, by a substantially improved iron resorption which reaches its optimum rate, without causing side effects, when the preparation is taken on an empty stomach. It is, therefore, not necessary to administer an overdosage — as it is usual with known preparations — which brings about intolerability effects, such as a local irritation of the gastric mucous membrane, vomiting, or obstipation. In order to diminish such side effects due to the usual overdosage, the known preparations are prescribed to be taken after meals, whereby, however, the resorption rate is still further reduced. In contradistinction thereto, the preparation of the invention is very well tolerated even on an empty stomach and is excellently resorbed.

Moreover, it involves the advantage that a smaller dosage unit is required in regard to the lower iron content, that it is especially not necessary to add auxiliaries that, generally, have a negative influence on the resorption, that the teeth are not discolored as is, in many cases, observed when known preparations are taken, and that the use of an excess of, for example, ascorbic acid causes excellent stabilization of the iron-II ion.

The oral preparation, especially a hard gelatine capsule, can be manufactured in a very simple manner, for example by screening the components to be used in a dried anhydrous form and mixing them homogeneously under dry conditions, preferably at a relative atmospheric humidity below 20 percent. If the mixture is intended to be processed into a hard gelatine capsule or into one of the above-cited galenic preparations, for example, tablets or dragées, the manufacture thereof is effected in known manner.

The iron preparation of the invention have a good shelf-life, even under tropical conditions, when stored with exclusion of moisture.

It was not expected that the very simple iron preparation of the present invention, in contrast to the known preparations, would exhibit a substantial improved iron resorption and thus a considerably quicker remedy of iron deficiencies and, at the same time, a convincingly better tolerability.

The following Example illustrates the invention but is not intended to limit it thereto.

EXAMPLE 155.5 mg of iron-II sulfate, dried (anhydrous)

| | |
|---|---|
| corresponding to $Fe^{++}$ | 50.0 mg |
| ascorbic acid (anhydrous) | 220.0 mg |
| and sodium bicarbonate (anhydrous | 85.0 mg | were sieved, mixed until homogeneous under dry conditions (below 20 percent rel. atmospheric humidity) and then filled into hard gelatine capsule.

The iron-II sulfate was dried, for example, at 150° C (for 10 hours).

We claim:

1. An iron preparation in drip dosage unit form for oral administration, said preparation comprising
   a. a salt of iron (II), the anion of which is physiologically tolerable, in an amount containing from 10 mg to 200 mg of ferro-ions;
   b. an alkali metal or alkaline earth metal carbonate or bicarbonate; and
   c. from 50 mg to 1,000 mg of a pharmaceutically tolerable solid acid of sufficient acidity to liberate carbon dioxide from said carbonate or bicarbonate; said carbonate or bicarbonate being present in an amount approximately equivalent to said acid for evolving carbon dioxide in the stomach.

2. A preparation as in claim 1 wherein said iron (II) salt is iron sulfate.

3. A preparation as in claim 1 wherein said solid acid is ascorbic acid.

4. A preparation as in claim 1 wherein said bicarbonate is sodium bicarbonate.

5. A preparation as in claim 1 in a hard gelatine capsule.

6. An iron preparation in dry dosage unit form for oral administration, said preparation comprising
   a. iron (II) sulfate in an amount containing from 10 mg. to 200 mg. of ferro-ions;
   b. sodium bicarbonate;
   c. from 50 mg. to 1,000 mg. of ascorbic acid; said bicarbonate being present in an amount approximately equivalent to said acid for evolving carbon dioxide in the stomach.

7. A preparation as in claim 6 in a hard gelatine capsule.

* * * * *